Patented July 15, 1952

2,603,664

UNITED STATES PATENT OFFICE 2,603,664

PURIFICATION OF BENZENE HEXACHLORIDE

Leslie James Burrage, Liverpool, England, assignor to Imperial Chemical Industries Limited, a corporation of Great Britain No Drawing. Application October 23, 1947, Serial No. 781,769. In Great Britain November 18, 1946

5 Claims. (Cl. 260—648)

This invention relates to improvements in the purification of benzene hexachloride.

In British Specification No. 573,689 there are described and claimed pest control compositions comprising benzene hexachloride prepared by the additive chlorination of benzene in the presence of actinic radiation and therefore containing a significant proportion of gamma benzene hexachloride, or a solution thereof, in intimate association with carrier material or diluent which is a non-solvent for the benzene hexachloride under the conditions of use. Further, in British Specification No. 573,693 a process is described and claimed which includes the step of recovering the gamma isomer by extraction of the crude benzene hexachloride with a lower aliphatic alcohol.

It has been observed that an irritant action is associated with the delta isomer which is present along with the alpha, beta and gamma isomers in the crude benzene hexachloride and that, in certain applications, for example in insecticidal sprays to be used in enclosed spaces, the existence of this irritant effect is disadvantageous.

Although in many solvents the delta isomer is much more soluble than the other three isomers, it is not easy to remove it from the crude material since extraction even with a small amount of solvent results also in solution of the gamma isomer. It has not in consequence hitherto been found commercially feasible to separate further the gamma and delta isomers from this extract, without considerable loss of the valuable gamma isomer.

According to the present invention, the delta isomer is substantially removed from benzene hexachloride by a process which comprises subjecting the benzene hexachloride to extraction with aqueous methanol or aqueous ethanol in amount sufficient to dissolve all the delta isomer present without dissolving any substantial proportion of the gamma isomer, and separating the liquid phase from the solid.

Any benzene hexachloride which contains the delta isomer may be treated by the process of the invention. For example, in the process for the recovery of crude benzene hexachloride from the product of the actinic chlorination of benzene, unchanged benzene is flashed off by contacting with hot water; the crude benzene hexachloride so obtained may be subjected directly to extraction with aqueous methanol or ethanol to remove irritant delta-isomer therefrom. Instead of using the crude material referred to above, there may be employed the gamma concentrate obtained by extracting the said crude material with a non-aqueous solvent, distilling off the solvent from the filtered extract, and drying the residue.

By suitable adjustment of the percentage of water in the aqueous methanol or ethanol, it is possible to avoid bringing any considerable amount of the gamma isomer into solution during the extraction. The proportion of water present may vary, for instance, between 10 and 50 per cent by weight of the mixture, and it is found that mixtures containing from 10 to 30 per cent by weight of water are particularly advantageous. Aqueous alcohols whose water content is more than 50 per cent by weight can be used, but the solubility of all the isomers decreases with increase in the proportion of water, and the bulk of solvent necessary for the extraction is liable to become uneconomic and unmanageable.

The total amount of solvent required for the extraction will of course depend upon the solubility of the delta isomer in the solvent mixture chosen, and the minimum amount which should be used is that which will dissolve all the delta isomer present without dissolving any substantial amount of the gamma isomer. The following table illustrates the relative solubilities of the individual gamma and delta isomers in a number of water-methyl alcohol mixtures at 20° C. and the approximate minimum quantity of solvent necessary to dissolve the delta can be calculated from these data. The solubilities are given as the number of parts of gamma and delta isomer respectively present in 100 parts by weight of a saturated solution containing only the one isomer.

| Solvent composition | | Solubility of | |
|---|---|---|---|
| Methyl alcohol | water | Gamma isomer | delta isomer |
| 100 |  | 6.77 | 27.25 |
| 95 | 5 | 4.05 | 19.33 |
| 90 | 10 | 2.98 | 13.24 |
| 85 | 15 | 2.53 | 10.42 |
| 80 | 20 | 1.18 | 6.57 |
| 75 | 25 | 0.99 | 3.95 |
| 70 | 30 | 0.35 | 1.89 |
| 60 | 40 | 0.18 | 0.48 |

The extraction is suitably carried out at room temperature. Higher temperatures can be used if desired, and it would then be necessary to take into account the somewhat greater solubility of the isomers with increase of temperature. There is, however, no great advantage in use of higher temperatures which would balance the extra cost of heating large volumes of solvent.

The residue obtained after treatment of the crude benzene hexachloride according to the invention contains only the alpha, beta, and gamma isomers and is suitable for use in the production of pest control compositions. It may, however, be subjected to further extraction with a non-aqueous solvent to obtain the gamma isomer alone or a concentrate having an enhanced gamma content as described in British Specification No. 573,693, relating to extraction with methanol or ethanol, or in British Specification Nos. 586,439 and 586,442, relating to a number of other suitable solvents.

The delta isomer present in the extract may if desired be recovered therefrom by known methods, for example, by concentration and fractional crystallisation, or by fractional precipitation with water followed by recrystallisation from solvents in which it has only a low solubility such as carbon tetrachloride.

In one method of carrying out the invention the crude benzene hexachloride obtained by the direct chlorination of benzene in presence of actinic radiation is stirred with sufficient aqueous methanol or ethanol at room temperature to dissolve all the delta isomer, the weights of solvent and benzene hexachloride being calculated by consideration of the solubility data. The mixture is filtered and the undissolved solid washed with a further small quantity of solvent and dried by any suitable method, for example, in an air oven. This solid contains approximately all the gamma isomer and may if desired be subjected to further treatment to isolate the latter. The delta isomer is recovered from the filtrate by adding more water to the aqueous alcoholic solution until the solid material is precipitated. This solid comprises the delta isomer and may also contain the impurities present in the original crude material. The pure delta isomer is obtained by recrystallisation from a solvent in which it has only a low solubility. Carbon tetrachloride is very suitable for this purpose, but there are a number of other solvents which can be used such as, for example, certain aliphatic hydrocarbons.

In a further application of the invention the crude benzene hexachloride is stirred with up to three times its weight of methanol, or ethanol, at room temperature and the mixture filtered under vacuum. The filter cake may be washed with a further small quantity of the alcohol in order to remove any solution retained by the solid. The extract and washings are combined and heated until the alcohol ceases to distil over.

The residue will still contain the four isomers, but a great part of the alpha and beta isomers will have been removed. This residue is now stirred for a further period at room temperature with sufficient aqueous methanol or ethanol to remove all the delta isomer, the mixture is filtered under vacuum, and the insoluble gamma concentrate is dried in any convenient manner. The final product contains over 75% of the total gamma isomer present in the original material and is completely free from the delta isomer and non-benzene hexachloride impurities. Practically all the alcohol used in this method can be recovered and the combined process is thus suitable for continuous working.

The amount of non-aqueous solvent used in the first stage of the combined extraction may advantageously be rather more than that recommended in British Specification No. 573,693, say up to three times the weight of the benzene hexachloride, in order to ensure that as much of the gamma isomer as possible is extracted from the crude substance.

After stirring with the solvent it is desirable to remove the latter as rapidly and efficiently as possible in order to avoid evaporation losses. A slow filtration with its attendant higher evaporation rate will result in deposition of the delta isomer and impurities which were dissolved in the evaporated solvent, and the separation will be incomplete.

The following examples illustrate but do not limit the invention, all parts being by weight.

Example I

Benzene was chlorinated by passing in gaseous chlorine at 50° C. while irradiating with a mercury arc lamp. When the quantity of chlorine reacted corresponded with the formation of a 20% solution of benzene hexachloride in benzene, the chlorination was stopped and the solution added to hot water so as to flash off the unchanged benzene. The crude material so obtained was dried and ground and contained approximately 12% of gamma isomer and 5–6% of delta isomer.

200 parts of the crude benzene hexachloride were stirred for about 2 hours at 20° C. with 200 parts of aqueous methanol in which the proportion of methanol to water was 80 to 20. The mixture was filtered and washed with a further 35 parts of solvent and then dried in an air oven at 50–60° C. 177.5 parts of solid were obtained which were free from the irritant delta isomer.

Example II 1000 parts of crude benzene hexachloride, prepared as in Example I and containing approximately 133 parts of gamma isomer and 50 parts of delta isomer, were stirred for 2 hours at 20° C. with 2820 parts of methanol. The mixture was filtered under vacuum and the solid washed with a further 433 parts of methanol. The filtered extract and washings were combined and transferred to a still where the methanol was distilled off. The solid residue from the distillation contained most of the gamma isomer, the delta isomer, and small amounts of the alpha and beta isomers. It was then stirred for a further 2 hours at 20° C. with 1760 parts of aqueous methanol in which the proportion of alcohol to water was 73 to 27. The mixture was filtered under vacuum to remove the solution of delta isomer and impurities, and the residue containing the gamma isomer was air dried at 50–60° C. 185 parts of solid were thus obtained, and these contained 100 parts of the gamma isomer.

I claim:

1. A process for removing delta isomer from benzene hexachloride which comprises the step of extracting with a mixture of water and a lower aliphatic alcohol containing not more than two carbon atoms in the molecule and containing from 10 to 50% by weight of the water.

2. A process as set forth in claim 1 wherein the benzene hexachloride is the crude product obtained by the additive chlorination of benzene and contains approximately 6% of the delta isomer.

3. A process as set forth in claim 1 wherein the benzene hexachloride comprises a mixture of the gamma and delta isomers obtained by extracting the additive chlorination product of benzene with a non-aqueous solution of a lower aliphatic alcohol whereby the gamma and delta isomers are separated from the greater part of the alpha isomer.

4. A process as set forth in claim 1 wherein the lower aliphatic alcohol is methanol.

5. A process for separating delta isomer from benzene hexachloride which comprises extracting the additive chlorination product of benzene with up to three times its weight of a non-aqueous lower aliphatic alcohol, filtering under reduced pressure, removing the solvent from the filtrate by distillation, subjecting the distillation residue to a further extraction with a mixture of water and a lower aliphatic alcohol containing not more than two carbon atoms in the molecule and containing from 5 to 50% by weight of water, filtering the resulting solution under vacuum and recovering the insoluble benzene hexachloride.

LESLIE JAMES BURRAGE.

REFERENCES CITED

The following references are of record in the file of this patent:

UNITED STATES PATENTS

| Number | Name | Date |
|---|---|---|
| 2,438,900 | Cooke et al. | Apr. 6, 1948 |

FOREIGN PATENTS

| Number | Country | Date |
|---|---|---|
| 447,058 | Great Britain | May 7, 1936 |
| 573,693 | Great Britain | Dec. 5, 1945 |

OTHER REFERENCES

Van der Linden: "Ber. der deut. chem. Gesell.," vol. 45, pages 231–6 (1912).